Oct. 8, 1963   B. W. PEROVICH   3,106,006
TROWELER
Filed July 24, 1961
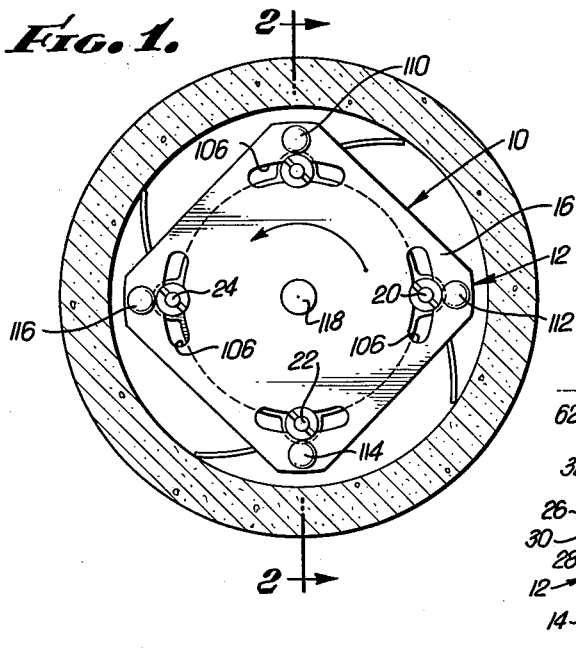
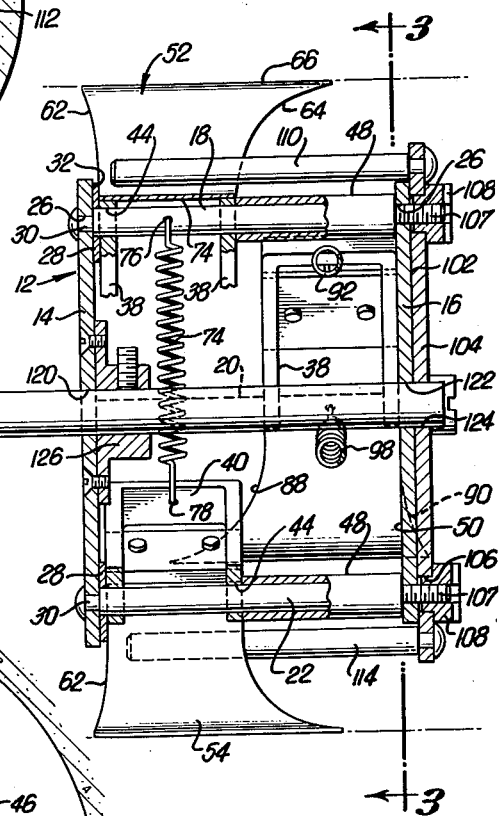
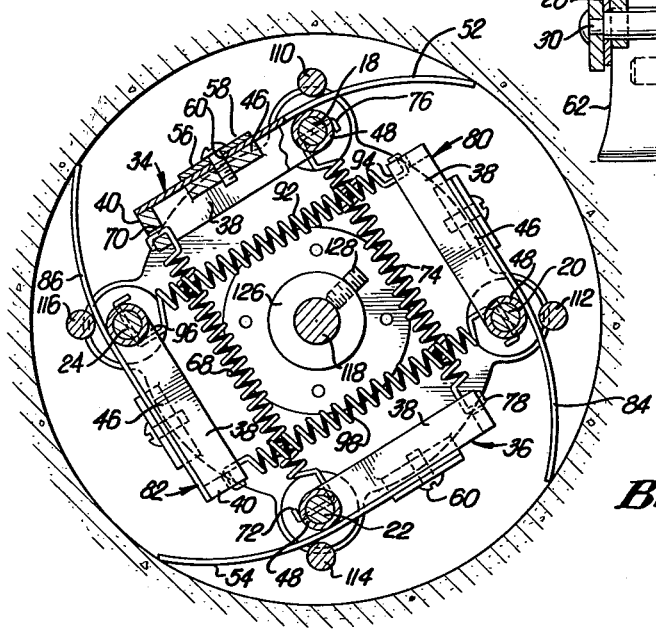
INVENTOR.
BATRIS W. PEROVICH
BY John Joseph Hall
ATTORNEY.

3,106,006
TROWELER
Batris W. Perovich, 1660 S. Oak Knoll,
San Marino, Calif.
Filed July 24, 1961, Ser. No. 127,451
1 Claim. (Cl. 25—38)

My invention relates to improvements in a troweler for use in the lining of pipe interiors with cement or similar material.

Hitherto, conventional apparatus for the lining of pipe interiors with cementitious material leaves superfluous cementitious material in the form of pimples or knobs on the cementitious lining due to the impact of cement when thrown from the apparatus onto the pipe interiors. Such superfluous material substantially increases the friction or drag of fluids passing through the pipe by a factor of up to 25 times of what the friction or drag would be in a smooth walled pipe interior. Conventional apparatus provides no means for correcting the pimples or knobs of cementitious material thus left on the cement lining of the pipe interior.

My invention provides a device for smoothing the pimples or knobs of superfluous cementitious material to provide a polished smooth finish greatly reducing fluid friction or fluid drag of fluids passing through the pipe. My device can be used on pipe interiors down to a diameter of 4 inches.

It is, therefore, an object of my invention to provide an apparatus for use in conjunction with conventional devices for the cementitious lining of pipe interior walls which will smooth over protuberances left on the surface of the cementitious lining by conventional pipe lining devices.

Another object of my invention is to provide an apparatus which will product a highly polished surface of the cementitious lining of pipe interiors while at the same time removing protuberances left on the surface of the cementitious lining due to excess cementitious material.

A further object of my nvention is to provide an apparatus which can be used to smooth and polish the cementitious lining of pipe interiors having a diameter from 18 inches down to as little as 4 inches.

These and other objects will be more readily understood by reference to the following description and claims, taken in conjunction with the accompanying drawing forming a part hereof, in which FIGURE 1 is a rear elevational view of my invention shown inside a pipe.

FIGURE 2 is a view of my device taken along line 2—2 of FIGURE 1.

FIGURE 3 is a view of my device taken along line 3—3 of FIGURE 2.

In the construction of my invention, with reference to the embodiment illustrated in the drawing, the troweler 10 has a frame 12 consisting of a front connector plate 14 joined to a back plate 16 by bolts 18, 20, 22, and 24, inserted into holes 26 of the front connector plate 14 and back plate 16. Washers 28 are inserted around the front ends of the bolts 18, 20, 22, and 24, at 30 next to the rear surface 32 of the front connector plate 14.

Front paddle supports 34 and 36, each consisting of a pair of parallel arms 38 joined at right angles to the connecting bar 40 at 42 and having holes 44, and a square platform 46 welded to the middle portion of the inner sides of the parallel arms, are assembled within the frame 12 by slipping one pair of arms 38 onto bolt 18 and the other pair of arms 38 onto bolt 22 by means of the holes 44 and moving the paddle supports 34 and 36 next to the washers 28 around bolts 18 and 22.

To maintain the front paddle supports in position, guide sleeves 48 are placed around the bolts 18 and 22 between the front paddle supports 34 and 36 and the front surface 50 of the back plate 16.

Front troweling paddles 52 and 54 are then fixed into position on the platforms 46 of the front paddle supports 34 and 36 by brackets 56 having flanges 58 and by screws 60.

The front troweling paddles 52 and 54 are identical in shape, having a moderately flared out leading edge 62 and an extremely flared out trailing edge 64 with straight tips 66. The front troweling paddles are preferably made of light and thin spring steel, but may be made of any material having similar qualities to spring steel of resilience, strength, and springiness.

Torsion spring 68 is then attached to the connecting bar 40 of front paddle support 34 at 70 and to the bolt 22 at 72, so that torsion spring 68 is in a plane parallel to the plane of front connector plate 14. Torsion spring 74 is attached to bolt 18 at 76 and to the connecting bar 40 of front paddle support 36 at 78, so that torsion spring 74 is in a plane parallel to the plane of front connector plate 14.

Rear paddle supports 80 and 82 are constructed in the same manner as the front paddle supports 34 and 36, and have parallel arms 38 joined at right angles to connecting bar 40 with holes 44 in the arms 38 and welded square platforms 46. The rear paddle supports 80 and 82 are assembled on bolts 20 and 24 in the same manner as the front paddle supports 34 and 36, except that the rear paddle supports are moved next to the front surface 50 of the back plate 16. To maintain the rear paddle supports 80 and 82 in position, guide sleeves 48 are placed around the bolts 20 and 24 between the rear paddle supports 80 and 82 and the washers 28 around bolts 20 and 24.

Rear troweling paddles 84 and 86 are then fixed into position on the platform 46 of the rear paddle supports 80 and 82 by brackets 56 having flanges 58 and by screws 60 in the same manner as front troweling paddles 52 and 54, but although the rear troweling paddles 84 and 86 have the identical shape of the front troweling paddles 52 and 54, it is the leading edges 88 of the rear troweling paddles which are extremely flared out and the trailing edges 90 of the rear troweling paddles which are moderately flared out, just the opposite of the front troweling paddles 52 and 54.

Torsion spring 92 is then attached to the connecting bar 40 of rear paddle support 80 and 94 and to the bolt 24 at 96, so that torsion spring 92 is in a plane parallel to the plane of front connector plate 14. Torsion spring 98 is attached to bolt 20 at 100 and to the connecting bar 40 of rear paddle support 82, so that torsion spring 98 is in a plane parallel to the plane of front connector plate 14.

Adjacent to the rear surface 102 of the back plate 16 is an adjustable plate 104 for adjusting the troweler to various diameters of pipe interiors. The adjustable plate 104 has slots 106 at each corner through which pass the threaded ends 107 of bolts 18, 20, 22, and 24. The adjustable plate is slidably secured to the back plate 16 by tightening screws 108 threaded on the threaded ends 106 of the bolts 18, 20, 22, and 24.

The adjustable plate 104 has paddle limiting rods 110, 112, 114, and 116, extending towards the front connector plate 14 and riveted perpendicularly to the adjustable plate 104. Front paddle limiting rods 110 and 114 extend almost to the leading edges 62 of front troweling paddles 52 and 54, while rear paddle limiting rods 112 and 116 extend only a little beyond the leading edges 88 of rear troweling paddles 84 and 86.

In the operation of the troweler, a drive shaft 118 from pipe lining apparatus (not shown) is inserted through holes 120, 122, and 124, each registerable with each other and respectively in the center of front connector plate 14, rear plate 16, and adjustable plate 104. To help stabilize the drive shaft 118, front connector plate 14 carries a boss 126 attached around the hole 120 on the rear surface 32 of front connector plate 14. The drive shaft 118 is secured to the troweler by a set screw 128 tapped into boss 126.

The drive shaft 118 is the conventional shaft for the dispensing head (not shown) of conventional pipe lining apparatus and is provided with a reduction type clutch (not shown) of various conventional types placed between the dispensing head and the troweler. Thus, the troweler follows immediately behind the pipe lining apparatus and smooths and polishes the lining right after it is deposited.

In use, when seen as illustrated in FIGURE 1, the troweler revolves on the shaft 118 in a counterclockwise direction at a speed which can vary from 1 to 150 revolutions per minute, depending upon the diameter of the pipe being lined and the thickness of the lining. All of the paddles of the troweler have an inherent slight bend in a direction away from the direction of rotations so that a gentle brushing action is produced against the just deposited lining as the drive shaft 118 rotates.

For optimum results, the brushing action of the front troweling paddles 52 and 54 should be slightly stiffer than the rear troweling paddles 82 and 84 since the front paddles are the first to encounter and initially smooth out protuberances and pimples left on the lining, while the rear paddles glide over the lining and polish it to a smooth finish. The rear paddles slightly overlap the front paddles to smooth out and polish any ridges which may be left by the front paddles after smoothing out protuberances and pimples of the lining. A smooth, highly polished lining is the end result. The stiffer action of the front troweling paddles 52 and 54 may be obtained by using a heavier gauge metal for the paddles or by using stiffer torsion springs 68 and 74. The pressure exerted by the front paddles on the lining may vary from 10 ounces up to 2 pounds, while the pressure from the rear paddles should not exceed one pound.

The paddle limiting rods 110, 112, 114, and 116 prevent the paddles from excessive bending in operation, while the flanges 58 on the brackets 56 in conjunction with the paddle limiting rods prevent the paddles from overturning and also prevent excessive distortion of the torsion springs 68, 74, 92, and 98.

The paddle limiting rods 110, 112, 114, and 116 have another function in conjunction with the adjustable plate 104. The troweler may be adjusted as required to various diameters of pipe interiors by rotation of the adjustable plate 104. For example, to increase the radius of the effective action of the troweling paddles for a larger diameter pipe interior, the adjustable plate 104 as seen in FIGURE 1 is rotated counterclockwise as permitted by the slots 106 and is then secured in its new position by tightening screws 108. The new position of the adjustable plate 104 automatically moves all of the paddle limiting rods 110, 112, 114, and 116 away from their respective neighboring paddles, thereby permitting an increase in the radius of the springing action of the paddles.

To decrease the radius of the action of the paddles, the adjustable plate 104 is rotated clockwise, thereby moving the paddle limiting rods 110, 112, 114, and 116 closer to their respective neighboring paddles and consequently decreasing the radius of the springing action of the paddles.

I have found that the shape of the paddles as shown in the embodiment of my invention illustrated in the drawing produces the best results; however, the paddles may be square, oblong, or rounded in shape and my troweler will still produce good results.

The parts of the troweler may be made of any type of material which is capable of being formed into the particular part desired and which possesses the characteristics required by that part. While the troweler may be constructed from any type of metal having the requisite strength, aluminum is preferable because of its light weight.

While I have described my invention in detail with reference to the accompanying drawing illustrating the preferred embodiment of my invention, it is understood that numerous changes in the details of construction and arrangement of parts may be made without departing from the spirit and scope of the invention as hereinafter claimed.

I claim:

A troweler for smoothing and polishing cementitious linings of pipe interiors, comprising, a rotatable frame having a front plate and a back plate joined together by four longitudinal bolts; a front pair of paddle members capable of radial movement about the same axis as the frame and pivotally mounted on one pair of said bolts, one paddle member to a bolt, and maintained in a position extending outwardly from the frame by spring members connecting each of said paddle members to one of each of a second pair of said bolts, one paddle member to a bolt; a rear pair of paddle members capable of radial movement about the same axis as the frame and pivotally mounted on said second pair of bolts, one paddle member to a bolt, and maintained in a position extending outwardly from the frame by spring members connecting each of said paddle members to one of each of the first pair of bolts, one paddle member to a bolt, both pairs of paddle members rotatable in the same direction as the frame when the frame is rotated; an adjustable plate member connected to the outer surface of the back plate; and four longitudinal rods fixed perpendicularly to each corner of the adjustable plate and extending toward the front plate, said rods controlling the extent of radial movement and pivoting of the paddle members and the diameter of rotation of the paddle members between limits set by adjustment of the adjustable plate member.

References Cited in the file of this patent

UNITED STATES PATENTS

| | | |
|---|---|---|
| 1,415,755 | Wright | May 9, 1922 |
| 1,988,329 | Perkins | Jan. 15, 1935 |
| 2,399,321 | Butler | Apr. 30, 1946 |
| 2,575,353 | MacEvoy | Nov. 20, 1951 |
| 2,667,356 | Forward | Jan. 26, 1954 |
| 2,764,194 | Schultz | Sept. 25, 1956 |
| 2,795,027 | Rossier | June 11, 1957 |
| 2,916,290 | Skillin | Dec. 8, 1959 |